March 3, 1959          L. E. SAUER          2,876,193
ELECTROSTATIC LIQUID CLEANERS
Filed Dec. 28, 1956
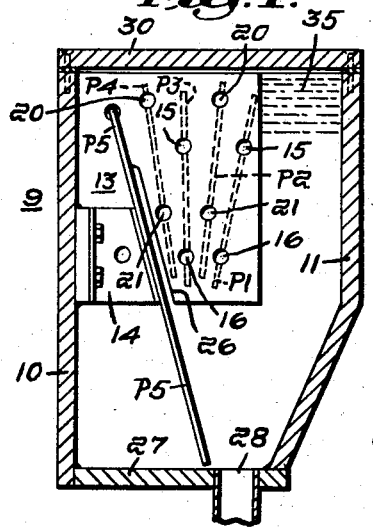
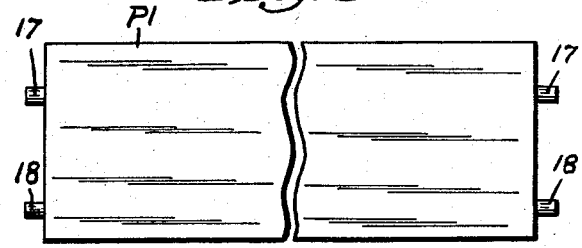
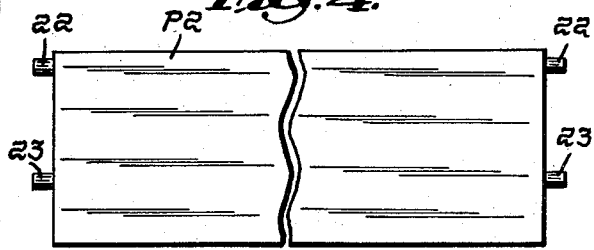
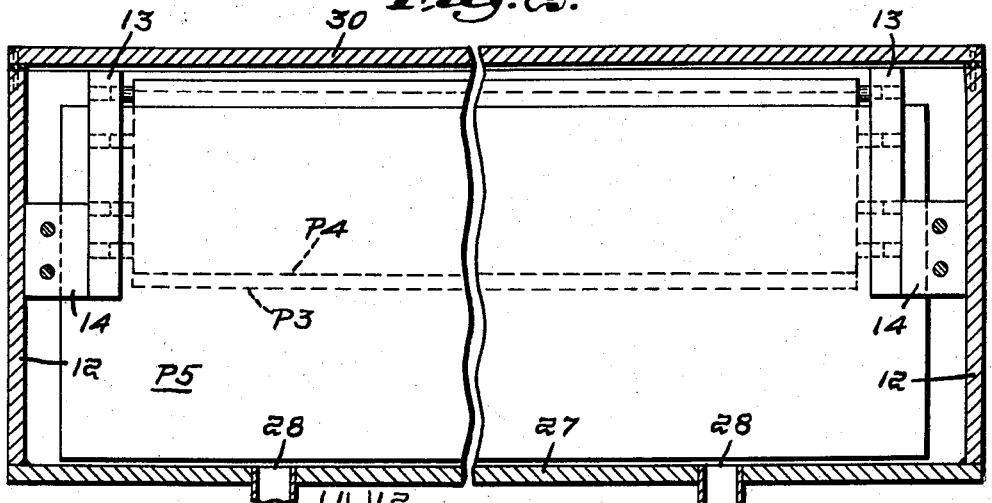
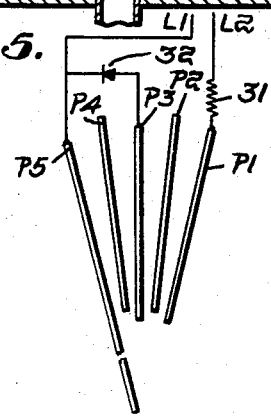
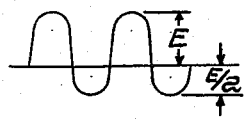
Inventor:
Louis E. Sauer,
by Robert J. Palmer
Attorney United States Patent Office 2,876,193
Patented Mar. 3, 1959

2,876,193

ELECTROSTATIC LIQUID CLEANERS

Louis E. Sauer, Sharon, Pa., assignor to Westinghouse Electric Corporation, East Pittsburgh, Pa., a corporation of Pennsylvania Application December 28, 1956, Serial No. 631,293

3 Claims. (Cl. 204—305)

This invention relates to electrostatic liquid cleaners, and has as objects to simplify and reduce the cost of such cleaners.

This invention provides a simple, inexpensive, trouble-free, electrostatic precipitator which has been found to be particularly suitable for removing the carbon formed by arcing in insulating oils of tap changing compartments of transformers.

In one embodiment of this invention, a series of spaced-apart metal plates inserted within a conductive liquid to be cleaned, forms a voltage divider to ground in the same manner that the spaced-apart plates of well known liquid rheostats do. Alternating current from a line or from a bushing potential tap is applied across the plates. A central plate is connected to ground through a half-wave rectifier which has a maximum-inverse voltage equal to one-half the voltage across the plates. During alternate half-cycles, the rectifier conducts and shorts out half of the plates, leaving the applied voltage across the other half of the plates. During the other half-cycles, the applied voltage is across all of the plates. This results in a net acceleration D. C. voltage of one-half the applied voltage, which D. C. voltage is sufficient to provide adequate electrostatic fields between adjacent plates for collection of foreign matter in the liquid.

This invention will now be described with reference to the annexed drawings, of which:

Fig. 1 is an end section of an electrostatic liquid cleaner embodying this invention;

Fig. 2 is a side section of the cleaner;

Fig. 3 is a side elevation of one form of collector plate;

Fig. 4 is a side elevation of another form of collector plate;

Fig. 5 is a circuit schematic showing how the collector plates are energized, and Fig. 6 is a graph showing the wave forms of the voltage at the collector plates of the cleaner.

A metal casing 9 has a vertically extending side 10 and has an opposite side with a lower portion 11 which slants inwardly towards the bottom of the casing, and has vertically extending ends 12.

Plates 13 of electric insulation are attached to metal brackets 14 which are attached to the inner surface of the casing side 10. The plates 13 have circular holes 15 and 16 extending therethrough to receive rods 17 and 18 respectively, which extend outwardly from the ends of similar collector plates P1 and P3. The plates 13 have circular holes 20 and 21 extending therethrough to receive rods 22 and 23 respectively, which extend outwardly from similar collector plates P2 and P4. The plates 13 thus support the plates P1—P4, insulated from each other. The rod receiving holes in the plates are so arranged that the collector plates P1—P4 converge towards the bottom 27 of the casing. Placing the supporting rods on adjacent plates out of horizontal alignment increases their insulating spacings.

The collector plates P1—P4 are spaced apart in the order given, the plate P1 being one of the outermost plates. The plate P1 is spaced sufficiently from the adjacent side 11 of the casing for adequate insulation. The other outermost collector plate is plate P5 which is attached, as by spot welding, to the brackets 14, and extends through slots 26 in the plates 13, the brackets 14 and the slots 26 being so arranged that the plate P5 converges towards the adjacent plate P4. The plate P5 is longer than the other collector plates, so that its lower end is adjacent to the bottom 27 of the casing. The central plate P3 extends vertically. The plates P1—P5 have parallel, longitudinal axes. The plate P5 and the opposite side 11 of the casing converge towards the bottom of the casing for causing collected matter to be directed into drain passages 28 located in the bottom 27 of the casing between the lower ends of the collector plate P5 and the casing side 11. The passage 28 would have a valve connected thereto which is not shown.

The slots 26 in the plates 13, through which the collector plate P5 extends are wider in the lower portions of the plates 13 than they are in the upper portions of the plates 13 for decreasing the dielectric stress on the lower portions of the plates 13 so as to prevent conducting paths from being formed across the lower portions of the plates 13 where the plate P5 more closely approaches the adjacent collector plate P4.

The casing has a removable top 30 for providing access to the collector plates.

As shown by Fig. 5, the collector plate P5 is connected to power line L1. The collector plate P1 is connected through a resistor 31 to power line L2. The central collector plate P3 is connected through half-wave rectifier 32 to L1. The collector plate P5 since contacting the metal bracket 14 connected to the metal casing 9, is connected to and grounded to the casing.

The casing 9 contains a conductive liquid 35 to be cleaned, such, for example, as transformer oil containing carbon or other conductive or charged particles to be removed, the liquid 35 acting as a resistor providing a voltage drop of $E/4$ between each pair of adjacent plates P1—P2, P2—P3, P3—P4 and P4—P5. The plates P2 and P4 provide a large portion of the required collection surface, and also reduce the voltage between adjacent plates to one-half that which would be required if they were not used.

The rectifier 32 since connected to a center and an end plate needs to have but one-half the voltage rating of a rectifier connected in series with all plates. Another advantage of connecting the rectifier to a center plate is that charged particles to be collected migrate both ways from the center plate as will be brought out in the description of operation to follow.

In operation, the rectifier 32 would conduct during alternate half-cycles, and short out the plates P3—P5. A D. C. voltage of $E$ would appear across the plates P1—P3, and there would be zero voltage across plates P3—P5 during such alternate half-cycles. The positive half-waves of Fig. 6 are the E voltages across plates P1—P3 during such alternate half-cycles. During the other half-cycles, there would be E voltage across all of the plates with $E/2$ voltage across the plates P1—P3 and across the plates P3—P5. The negative half-waves of Fig. 6 are the $E/2$ voltages across P1—P3 and P3—P5 during such other half-cycles. Thus, there is a net particle accelerating voltage of $E/2(E-E/2)$ which is positive, across the plates P1—P3 during all half-cycles, and a net accelerating voltage of $E/2(E/2-0)$ across the plates P3—P5 during all half-cycles, the latter voltage of $E/2$ being negative.

The foreign particles in the oil are given electrostatic charges by electrostatic induction, the polarities and values of which depend upon their positions in the electrostatic fields between adjacent plates, are attracted to the plates having opposite polarities, and are repelled by the plates having the same polarities. Referring now to Fig. 5, during all half-cycles, the net plus $E/2$ voltage across the plates P1—P3 causes charged particles between such plates to migrate from P3 towards P2, and from P2 towards P1, collecting upon the adjacent, downwardly sloping surfaces of P2 and P1, and the net negative voltage of $E/2$ across the plates P3—P5 causes charged particles between such plates to migrate from P3 towards P4, and from P4 towards P5, collecting upon the adjacent, downwardly sloped surfaces of P4 and P5. The surfaces of the plates upon which the particles deposit are the upper surfaces of the sloped plates, and gravity aids in causing the particles to adhere to the plates as they drain down their surfaces. If the particles were collected on the under surfaces of the plates P2 and P4, those surfaces facing plates P1 and P5 respectively, gravity would tend to cause such particles to fall off the plates.

The collector plates P1—P5 converge towards each other from their tops to their bottoms not only to facilitate adherence to the plates as described in the foregoing, but to increase the dielectric stress between the lower plate portions for collecting the smaller foreign particles which might escape collection by the more widely spaced, upper plate portions. This also aids in causing the liquid to recirculate from the bottoms of the plates over their tops.

The alternating current applied between the plate P1 and the adjacent, widely spaced wall 11 of the casing has no adverse effect upon the migration of particles between adjacent plates P1—P5, and results in no collection upon the casing walls since the alternating current could only cause the particles to surge back and forth in the passage provided for spacing and recirculation, between the plate P1 and the wall 11. The surging of the particles back and forth under the influence of the alternating current would heat the liquid and aid in its recirculation from the bottoms of the plates over their tops.

The collected particles agglomerate on the top surfaces of the plates P1, P2, P4 and P5, and slide down the plates falling off their bottoms in the form of sludge.

I claim:

1. An electrostatic liquid cleaner comprising a casing for receiving and containing a conductive liquid to be cleaned, a vertically extending, central collector plate in said casing, an equal number of spaced-apart, collector plates with substantially parallel, longitudinally extending axes, in said casing on each side of said central plate and sloped towards the bottom of said central plate so as to form passages between adjacent plates which converge towards said bottom of said central plate, said plates being arranged to have their lower portions immersed in said liquid, means for insulatedly supporting said plates whereby each plate is electrically insulated except for said liquid from the other plates, a half-wave rectifier having a terminal of one polarity connected to said central plate, and having a terminal of the opposite polarity connected to an end one of said plates, and means for supplying alternating current to the end ones of said plates.

2. An electrostatic liquid cleaner as claimed in claim 1 in which said casing is metal, in which one end one of said plates is grounded to said casing and extends to adjacent the bottom of said casing below the lower ends of the others of said plates, and in which said casing has a wall opposite and spaced from the other end one of said plates, said wall having a lower wall portion that slopes to said casing bottom towards the bottom of said one end plate, said one end plate and said wall portion forming therebetween a passage below said others of said plates that converges towards said casing bottom.

3. An electrostatic liquid cleaner comprising a casing for receiving and containing a conductive liquid to be cleaned, an odd number of spaced-apart collector plates extending in a row in said casing with their longitudinal axes parallel, and arranged to have their lower portions immersed in said liquid, means for supporting said plates so that each is electrically insulated except for said liquid from the others, a half-wave rectifier having a terminal of one polarity connected to the central one of said plates, and having a terminal of the opposite polarity connected to an end one of said plates, and means for supplying alternating current to the end ones of said plates.

References Cited in the file of this patent

UNITED STATES PATENTS

| | | |
|---|---|---|
| 1,296,988 | McKibben | Mar. 11, 1919 |
| 1,371,997 | Delafono | Mar. 15, 1921 |
| 1,529,249 | Gue | Mar. 10, 1925 |
| 1,637,795 | Andrews | Aug. 2, 1927 |
| 2,049,561 | Grave | Aug. 4, 1936 |
| 2,588,111 | Hanneman | Mar. 4, 1952 |
| 2,654,438 | Wintermute | Oct. 6, 1953 |

FOREIGN PATENTS

| | | |
|---|---|---|
| 836,750 | France | Oct. 28, 1938 |